3,146,183
PROCESS FOR MIXING TAR-DECANTER SLUDGE WITH COKE OVEN FEED COAL
William A. Reed, West Richfield, and John M. Roblin, Parma, Ohio, assignors to Republic Steel Corporation, Cleveland, Ohio, a corporation of New Jersey
Filed May 25, 1961, Ser. No. 112,669
5 Claims. (Cl. 208—8)

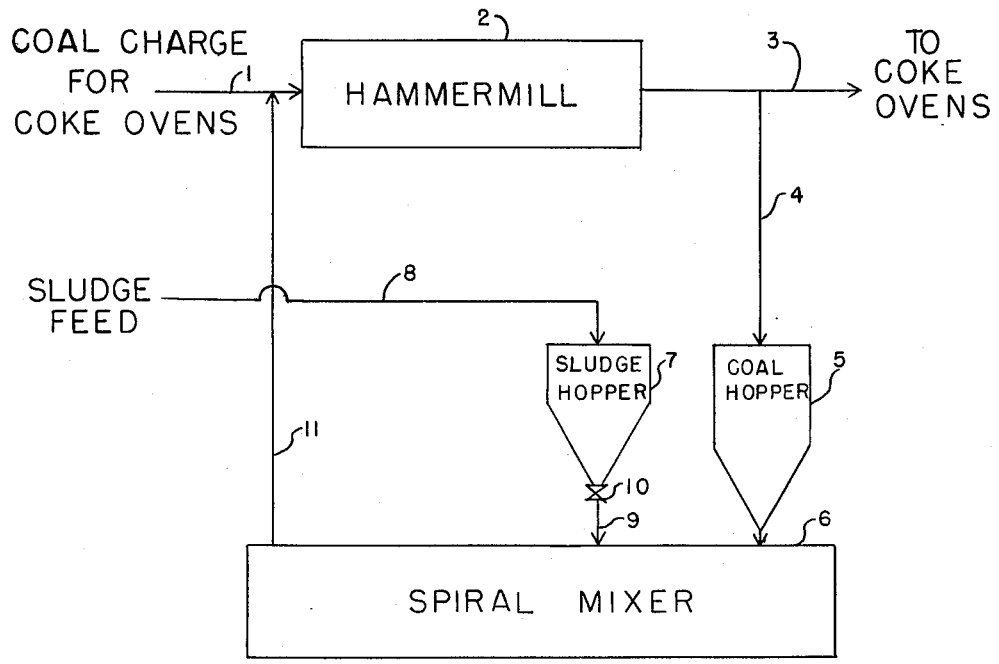
WILLIAM A. REED
JOHN M. ROBLIN
*INVENTORS*

This invention relates to a process using simple and relatively inexpensive equipment to convert tar-decanter sludge to useful products. More particularly, it relates to an improved process for mixing tar-decanter sludge with coal being processed for coking.

In many coke plants, sludge accumulated from the bottom of tar decanters and from the cleaning of tar tanks has created a disposal problem. In most cases, these sludges are merely deposited in pits or other dump areas. In many cases the available land area for such dumping operations is limited and eventually is used up. Moreover, the handling and hauling expenses are considerable.

In some cases attempts have been made to dispose of these sludges by mixing them with various types of fuels being burned in steel mill operations. However, before such mixing can be performed satisfactorily, the sludge must be ball-milled and otherwise processed to convert it to a condition satisfactory for mixture with the fuels. Colloid mills were found to be unsatisfactory because of abrasion and the need for constant adjustment to attain the desired particle size. It was found that a considerable investment in processing equipment is required to dispose of the tar decanter sludge in this manner. Some difficulties were encountered also in settling of the ground sludge from the tar mixture and it was found necessary in some cases to mix the ground sludge and tar immediately before being pumped into the furnace in which the fuel mixture was to be used, such as an open hearth furnace.

It also has been found unsatisfactory to add tar decanter sludge directly to the coal after or while it is being deposited in the coke oven. If the sludge is added at the top of the bed after the entire charge is added to the coke oven, most of the sludge is near the top of the oven and as the heating of the coal charge is effected during the coking operation, part of the sludge is evaporated and swept out by the hot gases emanating from the coking coal. Furthermore, the sludge is unevenly distributed over the coal and effective coking is not accomplished. Addition of the sludge during the charging of the coke oven with coal interferes with the charging operation and the longer time required for such charging operation reduces the production capacity of a coke oven. Furthermore, when the sludge is added in a lower section of the coal charge in the oven, the sludge is likewise unevenly distributed and a substantial portion of it flows to the bottom of the coke oven where it comes in contact with the hot oven bricks at the bottom and upon coking forms a layer on the brick which interferes with the efficiency of heat transfer.

Attempts to add sludge to coal before it is charged to the ovens have been found unsatisfactory in that the coal handling and storage equipment becomes coated with sludge. This results in unsatisfactory operation of the equipment and requires periodic cleaning. Moreover, the sludge is not uniformly distributed and is not utilized efficiently in the coking operation.

In accordance with the practice of this invention, it has been found that premixing of the coking coal and the tar decanter sludge by a mixing operation in a mixer which reduces the size of any sludge balls formed but without grinding the coal, an intimate mixture of sludge and coal is produced which gives additional coking values due to the presence of the sludge. While a double-motion paddle mixer also has been used satisfactorily, it is preferred that the mixing operation be conducted in a screw conveyor. It also has been found that while normal temperature, that is approximately 20° C. gives satisfactory results, particularly advantageous results are obtained when the sludge is added at a temperature of at least 40° C., preferably 42° C. to 65° C. or even higher.

Further, it is advantageous, although not necessary, to have the mixing trough heated so that the sludge-coal mixture attains a temperature of at least 40° C. By the practice of this invention, it has been found that such mixtures containing as much as 15% sludge flow freely and do not tend to agglomerate. Preferably, mixtures containing 8–10% sludge are used so as not to recycle too much coal.

In this process the sludge may be fed at any temperature between ambient temperature and the flash point of the sludge at the pressure of the feed tank. Higher temperatures permit the sludge to flow more freely and also reduce the size of the mixer required to mix the sludge and coal. In this respect the optimum temperature is determined by the cost of heating the sludge as compared to the cost saved by reduction in mixer size. However, the mixer temperature should not be higher than the point at which coking properties of coal are destroyed.

The accompanying drawing shows a flow sheet of a typical installation that can be used advantageously in the practice of this invention. This flow sheet illustrates how equipment used in the practice of this invention can be tied in with a hammermill or other comminuting equipment used in processing the coal to be charged to coke ovens.

In this typical operation, inlet line 1 feeds coal into hammermill 2 and the comminuted coal is transmitted to the coke oven by line 3. A small fraction of the comminuted coal is diverted by line 4 to a coal hopper 5 which in turn feeds into a spiral mixer or screw conveyor type mixer 6.

A sludge hopper 7 having sludge feed line 8 also is located above the spiral mixer with its outlet 9 feeding into the spiral mixer at a point after the coal inlet to the mixer. In this way the sludge is fed onto the coal and mixed intimately in their passage through the mixer. This intimate mixture then passes from the mixer back into the coal feed line to the hammermill or other comminuting equipment and in passing through the hammermill any lumps that may have formed are broken up. This recycling through the hammermill also serves to distribute the coal-sludge mix uniformly throughout the entire mass of coal.

In a typical installation processing 3,000 tons of coal per day, it is found advantageous to divert 100 tons of comminuted coal into the sludge mixing operation whereby ten tons of sludge is added. This results in a mixture of approximately 9 percent by weight of sludge which when fed back into the main coal stream results in a sludge content of 0.33 percent of the uniformly and intimately mixed coal-sludge feed going into the coke oven.

In addition to the screw conveyor type mixture referred to above, other types of mixers suitable for mixing solids can be used for the purposes of this invention. Such mixers include disc pelletizers, drum pelletizers, screw conveyor mixers, drum type mixers (similar to cement mixer), etc.

While, as stated above, premixes of 8–10% sludge are preferred and can contain as much as 15% sludge without reducing the free-flow properties and tendency to avoid agglomeration, tests have shown that by diverting considerably higher proportions of the main stream of coal to this premixing operation, as much as 6% can be introduced into the main coke oven coal charge without producing any adverse effects on the moisture content, combustibility, and the bulk density of the coke, and also does not develop any higher pressure during the coke operation than normally experienced.

By the practice of this invention, it is found possible to convert tar decanter sludge into coke and the gas and oil by-products obtained from coking operations. These products are more valuable than the heating value obtained when the sludge is used as a fuel. In addition to the increased gas, oil, and coke values obtained, dustiness of the coal feed is found to be reduced by the practice of this invention. Moreover, the type of equipment used in the practice of this invention is much less expensive than the comminuting equipment required for converting the sludge to a form satisfactory for use as fuel. On comparable throughput capacities, an installation for comminuting sludge for fuel purposes costs approximately five and one-half times that of the mixing installation used in this invention.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. A process for converting tar-decanter sludge to useful products comprising the steps of premixing said sludge at a temperature of at least 40° C. to give a premix of 8–15% sludge with a portion of the comminuted coal being used as feed for a coke oven, uniformly distributing said pre-mix through the main body of said coal charge, and thereafter coking the resultant mixture of coal and sludge.

2. A process of claim 1 in which said premix is recycled through the comminuting zone for said main body of said coal charge.

3. A process of claim 1 in which said coal and said sludge are heated during the mixing operation so as to obtain a temperature of at least 40° C. during the mixing operation.

4. A process for converting tar-decanter sludge to useful products comprising the steps of pre-mixing said sludge with a portion of the comminuted coal being used as coke oven feed, uniformly distributing said pre-mix throughout the main body of said coal charge, and thereafter coking the resultant mixture of coal and sludge, the proportions of said coal and said sludge used in said premix being such as to give 8–10% by weight of said sludge in said pre-mix, said sludge being added at a temperature of 40–65° C., and the temperature of said coal and said sludge being maintained at a temperature of at least 40° C. during the mixing operation.

5. A process for converting tar-decanter sludge to useful products comprising the steps of premixing said sludge at a temperature of at least 40° C. to give a premix of no more than 15 percent sludge with a portion of the comminuted coal being used as feed for a coke oven, uniformly distributing said premix through the main body of said coal charge, and thereafter coking the resultant mixture of coal and sludge.

References Cited in the file of this patent

UNITED STATES PATENTS

| | | |
|---|---|---|
| 1,842,132 | Trent | Jan. 19, 1932 |
| 2,304,773 | Anderton | Dec. 15, 1942 |
| 2,308,247 | Pott et al. | Jan. 12, 1943 |
| 2,832,724 | Doughty et al. | Apr. 29, 1958 |
| 2,913,388 | Howell et al. | Nov. 17, 1959 |